(12) United States Patent
Ohtsuka et al.

(10) Patent No.: US 8,434,948 B2
(45) Date of Patent: May 7, 2013

(54) OPTICAL FIBER CONNECTOR AND OPTICAL CABLE

(75) Inventors: Kenichiro Ohtsuka, Yokohama (JP);
Masahiro Hamada, Yokohama (JP);
Kouji Niikura, Osaka (JP); Daizou Nishioka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 240 days.

(21) Appl. No.: 12/597,099

(22) PCT Filed: Apr. 11, 2008

(86) PCT No.: PCT/JP2008/057180
§ 371 (c)(1),
(2), (4) Date: Oct. 22, 2009

(87) PCT Pub. No.: WO2008/133048
PCT Pub. Date: Nov. 6, 2008

(65) Prior Publication Data
US 2010/0086258 A1   Apr. 8, 2010

(30) Foreign Application Priority Data
Apr. 23, 2007  (JP) ................................. 2007-113394

(51) Int. Cl.
*G02B 6/38* (2006.01)
(52) U.S. Cl.
USPC ............................................. 385/65; 385/59
(58) Field of Classification Search .................... 385/65, 385/59
See application file for complete search history.

(56) References Cited

U.S. PATENT DOCUMENTS 4,639,076 A * 1/1987 Mikolaicyk et al. ............ 385/74
5,031,984 A * 7/1991 Eide et al. ....................... 385/27
(Continued)

FOREIGN PATENT DOCUMENTS

EP   0 814 353 A1   12/1997
EP   0 916 974 A2    5/1999
(Continued)

OTHER PUBLICATIONS

International Preliminary Report on Patentability issued in International Patent Application No. PCT/JP2008/057180 filed Apr. 11, 2008.

(Continued)

*Primary Examiner* — Kaveh Kianni
(74) *Attorney, Agent, or Firm* — McDermott Will & Emery LLP

(57) ABSTRACT

An optical fiber connector 1 is provided with a mechanical splice section 3 for mechanically securing and connecting optical fibers 2 to each other. The mechanical splice section 3 includes a base plate 5 having a V-groove 4 for positioning the optical fibers 2 and a pressing plate 6 for pressing the optical fibers 2 against the base plate 5. A wedge inserting recessed section 8 is arranged at a boundary portion between the base plate 5 and pressing plate 6. The optical fiber connector 1 is provided with a wedge member 9 having a wedge section 13 adapted to be inserted into the wedge inserting recessed section 8 for opening the base plate 5 and pressing plate 6 from each other; a wedge insertion releasing member 10 for pressing the wedge member 9, so as to take the wedge section 13 out of the wedge inserting recessed section 8; and a housing 11 for covering the mechanical splice section 3, wedge member 9, and wedge insertion releasing member 10.

8 Claims, 14 Drawing Sheets

U.S. PATENT DOCUMENTS

| | | | |
|---|---|---|---|
| 5,381,506 A * | 1/1995 | Amick et al. | 385/129 |
| 5,548,677 A * | 8/1996 | Kakii et al. | 385/92 |
| 5,682,450 A * | 10/1997 | Patterson et al. | 385/65 |
| 5,719,978 A * | 2/1998 | Kakii et al. | 385/89 |
| 5,732,174 A * | 3/1998 | Carpenter et al. | 385/72 |
| 5,734,770 A * | 3/1998 | Carpenter et al. | 385/72 |
| 5,764,833 A * | 6/1998 | Kakii et al. | 385/54 |
| 6,095,695 A * | 8/2000 | Ohtsuka et al. | 385/72 |
| 6,293,708 B1 * | 9/2001 | Ohtsuka et al. | 385/72 |
| 6,799,902 B2 * | 10/2004 | Anderson et al. | 385/89 |
| 6,870,996 B2 * | 3/2005 | Doss et al. | 385/134 |
| 7,637,673 B2 * | 12/2009 | Oike et al. | 385/98 |
| 2004/0057691 A1 * | 3/2004 | Doss et al. | 385/134 |
| 2005/0226566 A1 * | 10/2005 | Sasaki et al. | 385/55 |
| 2008/0075407 A1 * | 3/2008 | Saito et al. | 385/86 |
| 2008/0304795 A1 * | 12/2008 | Oike et al. | 385/81 |

FOREIGN PATENT DOCUMENTS

| | | |
|---|---|---|
| JP | 09-197170 | 7/1997 |
| JP | 10-170748 A | 6/1998 |
| JP | 2005-292429 A | 10/2005 |
| WO | WO 2005/119318 A1 | 12/2005 |

OTHER PUBLICATIONS

European Search Report issued in European Patent Application No. 08740277.2-1524/2138875, mailed Jul. 4, 2011.

M. Iwaya et al., "FTTH-yo Genba Kumitae Connector no. Kaihatsu," Furukawa Electric Review, vol. 119, Jan. 2007, pp. 7-12; w/English translation thereof.

* cited by examiner (a)

(b)

OPTICAL FIBER CONNECTOR AND OPTICAL CABLE

RELATED APPLICATIONS

This application is the U.S. National Phase under 35 U.S.C. §371 of International Application No. PCT/JP2008/057180, filed on Apr. 11, 2008, which in turn claims the benefit of Japanese Application No. 2007-113394, filed on Apr. 23, 2007, the disclosures of which Applications are incorporated by reference herein.

TECHNICAL FIELD

The present invention relates to an optical fiber connector for connecting optical fibers to each other and optical cable.

BACKGROUND ART

Known as an example of conventional optical fiber connectors is one comprising a lower housing having a V-groove for positioning optical fibers, an upper housing having a pressing section for pressing the optical fibers against the V-groove, and a leaf spring for pressing the lower and upper housings in a state where the V-groove of the lower housing and the pressing section of the upper housing are overlaid on each other as described in Patent Literature 1.
Patent Literature 1: Japanese Patent Application Laid-Open No. 10-170748

DISCLOSURE OF INVENTION

Technical Problem

When assembling optical fibers to the optical fiber connector of the above-mentioned prior art, a protrusion of a wedge plate is initially inserted into a wedge insertion hole in an overlapping portion between the lower and upper housings, so as to open the overlapping section, and the optical fibers are inserted into the V-groove in this state. Thereafter, the protrusion of the wedge plate is taken out of the wedge insertion hole, so as to close the lower and upper housings. Thus, the above-mentioned prior art makes it necessary for an operator to prepare a wedge plate, which is a dedicated jig, separately.

It is an object of the present invention to provide an optical fiber connector and optical cable by which operations of assembling optical fibers can be carried out without preparing dedicated jigs.

Solution to Problem

The optical fiber connector of the present invention comprises an optical fiber connecting member, having a base section for positioning optical fibers and a pressing section for pressing the optical fibers against the base section, for connecting the optical fibers to each other; a housing for covering the optical fiber connecting member; a wedge member, contained in the housing, having a wedge section adapted to be inserted into a boundary portion between the base section and pressing section so as to open the base section and pressing section from each other; and a wedge insertion releasing member, attached to the housing, for taking the wedge section out of the boundary portion between the base section and pressing section.

When connecting optical fibers together by such optical fiber connector, the wedge section of the wedge member is inserted into the boundary portion between the base section and pressing section of the optical fiber connecting member, so as to open the base section and pressing section from each other, and the optical fibers are butted against each other while being positioned with the base section from both sides of the optical fiber connecting member in this state. Then, the wedge insertion releasing member is pushed against the wedge member, so as to move the wedge member, whereby the wedge section is taken out of the boundary portion between the base section and pressing section. This places the base section and pressing section in a closed state, whereby the optical fibers are secured in the butted state. Since the optical fiber connector of the present invention is thus provided with the wedge member and wedge insertion releasing member, it is not necessary to prepare a dedicated jig for opening and closing the base section and pressing section each time, aside from the optical fiber connector and optical fibers. Therefore, the optical fibers can easily be assembled to the optical fiber connector.

Preferably, the wedge member is contained in the housing in such a state that the wedge section is inserted beforehand in the boundary portion between the base section and pressing section. This makes it unnecessary for operators to insert the wedge section of the wedge member into the boundary portion between the base section and pressing section of the optical fiber connecting member when connecting optical fibers together by the optical fiber connector, whereby the burden on the operators can be reduced.

Preferably, the housing is provided with a window section for passing therethrough the wedge member in a direction of inserting the wedge section. When it becomes necessary to reposition the optical fibers, for example, after taking the wedge section out of the boundary portion between the base section and pressing section by the wedge insertion releasing member in this case, the wedge member may be pushed in through the window section, whereby the wedge section can be reinserted into the boundary portion between the base section and pressing section.

More preferably, an end part of the housing is provided with a fiber insertion guide for inserting the optical fibers into the optical fiber connecting member, the fiber insertion guide has an open section formed on one side face of the housing, the wedge member is contained in the housing so as to be located on one of left and right sides of the open section, and the wedge insertion releasing member is attached to the housing so as to be located on the other of the left and right sides of the open section. Providing the end part of the housing with the fiber insertion guide having the open section makes it easy to position the optical fibers in the base section. Even when an operator holds the optical fiber connector by one hand such that the open section faces the operator and an optical fiber by the other hand, for example, positioning the wedge insertion releasing member at one of the left and right sides of the open section of the housing allows the hand holding the optical fiber connector to push the wedge insertion releasing member easily into the wedge member.

Preferably, the wedge insertion releasing member is integrated with the wedge member. This can reduce the number of components of the optical fiber connector, thereby suppressing its cost.

The optical cable of the present invention has the above-mentioned optical fiber connector attached to a cable end.

Since the optical fiber connector having the wedge member and wedge insertion releasing member is attached beforehand to a cable end, when connecting optical fibers together by the optical fiber connector, it is sufficient for such optical cable to assemble only an optical fiber to be connected to the optical fiber incorporated in the optical cable to the optical fiber connector, whereby no dedicated jig for opening and closing the base section and pressing section of the optical fiber connecting member is necessary. This allows the optical fiber assembling operation to be carried out easily.

Preferably, the optical fiber connecting member of the optical fiber connector holds an optical fiber exposed at the cable end, while a semisolid refractive index matching material is attached to a leading end of the optical fiber. Since the semisolid refractive index matching material is easy to remain, the refractive index matching property between optical fibers will be secured even if optical fibers are assembled to the optical fiber connector a plurality of times.

Advantageous Effects of Invention

The present invention allows operations of assembling optical fibers to be performed without preparing dedicated jigs. This can save labors of operators and improve workability.

REFERENCE SIGNS LIST

1 . . . optical fiber connector; 2 . . . optical fiber; 3 . . . mechanical splice section (optical fiber connecting member); 5 . . . base plate (base section); 6 . . . pressing plate (pressing section); 8 . . . wedge inserting recessed section; 9 . . . wedge member; 10 . . . wedge insertion releasing member; 11 . . . housing; 13 . . . wedge section; 18 . . . fiber insertion guide; 18a . . . open section; 19 . . . window section; 31 . . . wedge member (wedge member and wedge insertion releasing member); 40 . . . optical cable; 42 . . . optical fiber; S . . . semisolid refractive index matching material

DESCRIPTION OF EMBODIMENTS

In the following, preferred embodiments of the optical fiber connector and optical cable in accordance with the present invention will be explained in detail with reference to the drawings. In the explanation of the drawings, the same or equivalent constituents will be referred to with the same signs while omitting their overlapping descriptions.

Figure 1:
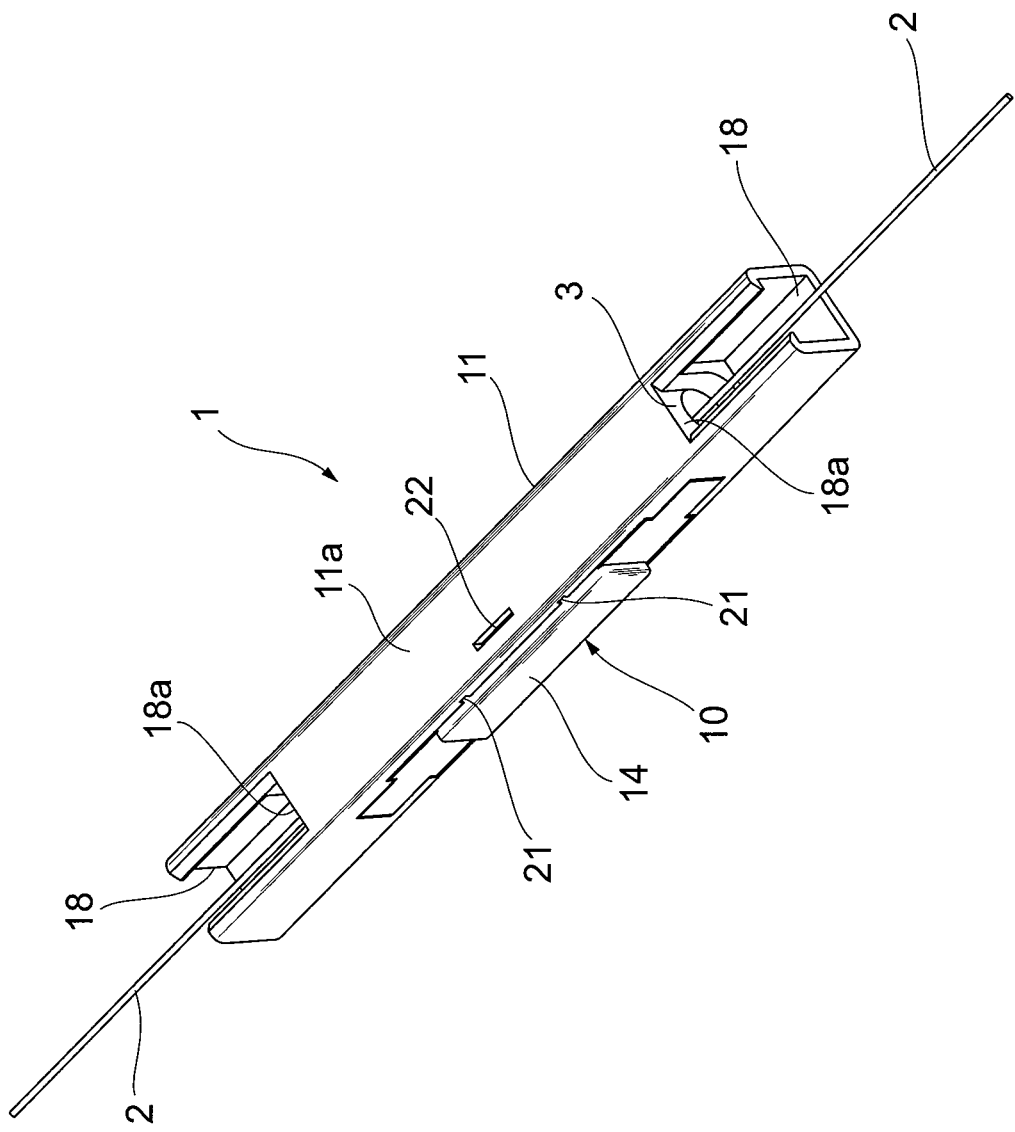
FIG. 1 is a perspective view illustrating a state where optical fibers are assembled to one embodiment of the optical fiber connector in accordance with the present invention.
Figure 2:
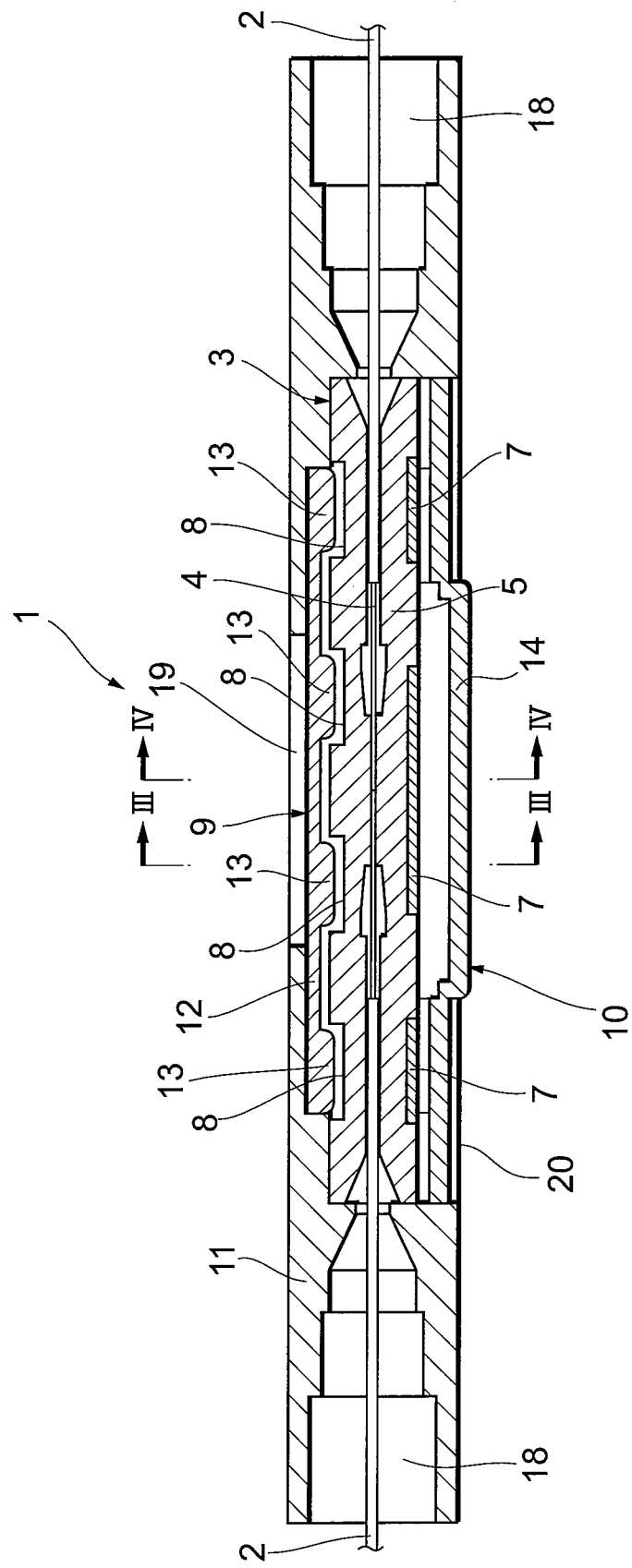
FIG. 2 is a horizontal sectional view of the optical fiber connector (including the optical fibers) illustrated in FIG. 1.
Figure 3:
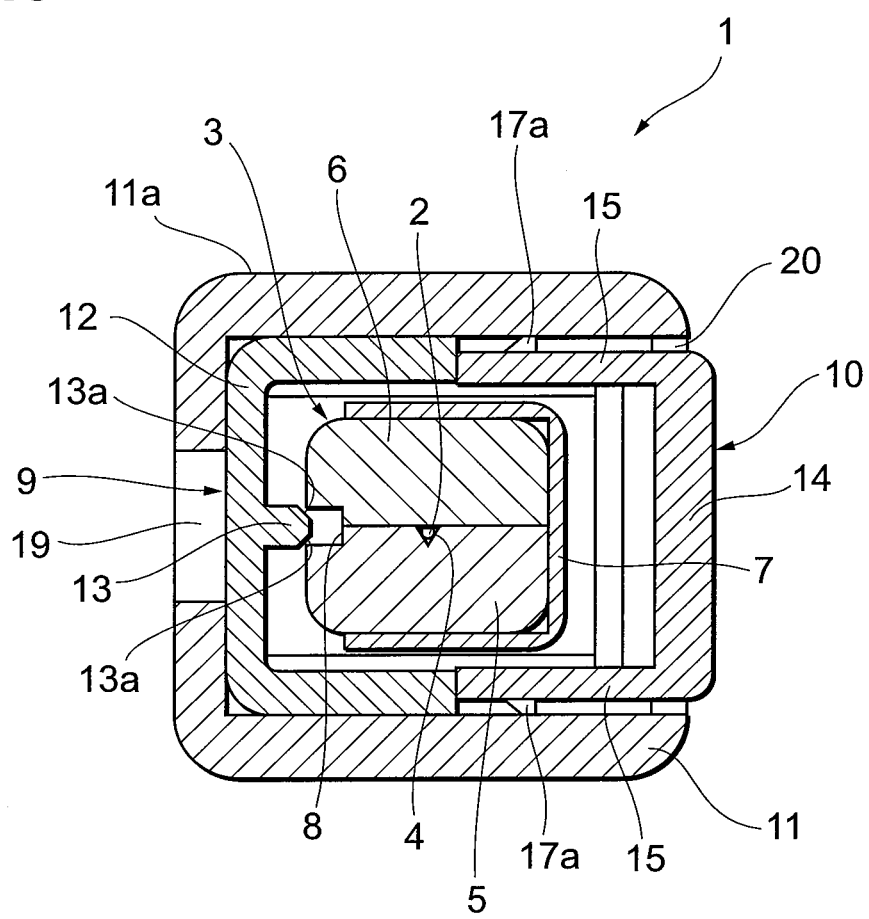
FIG. 3 is a sectional view taken along the line III-III of FIG. 2.
Figure 4:
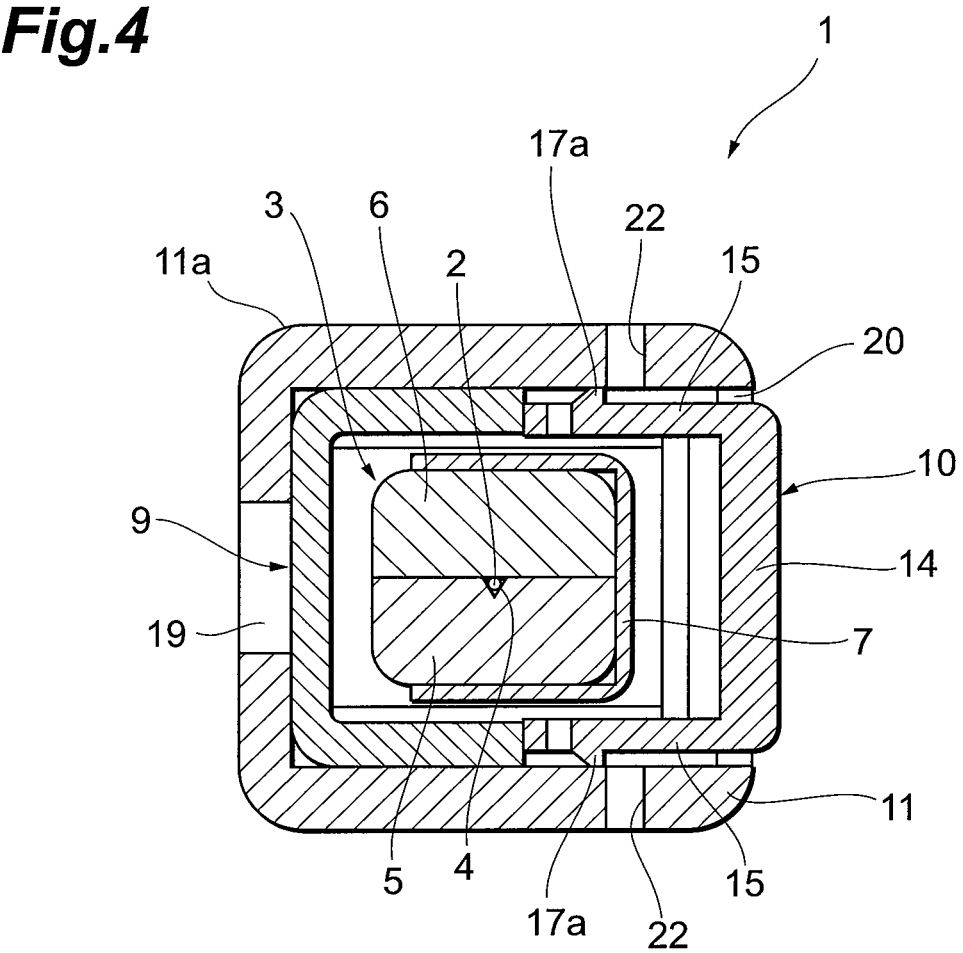
FIG. 4 is a sectional view taken along the line IV-IV of FIG. 2.

FIG. 1 is a perspective view illustrating a state where optical fibers are assembled to one embodiment of the optical fiber connector in accordance with the present invention, while FIG. 2 is a horizontal sectional view of the optical fiber connector (including the optical fibers) illustrated in FIG. 1. FIG. 3 is a sectional view taken along the line III-III of FIG. 2, while FIG. 4 is a sectional view taken along the line IV-IV of FIG. 2.

In each drawing, the optical fiber connector 1 in accordance with this embodiment is equipped with a mechanical splice section (optical fiber connecting member) 3, having a substantially rectangular cross section, for mechanically securing and connecting optical fibers 2 to each other.

Figure 5:
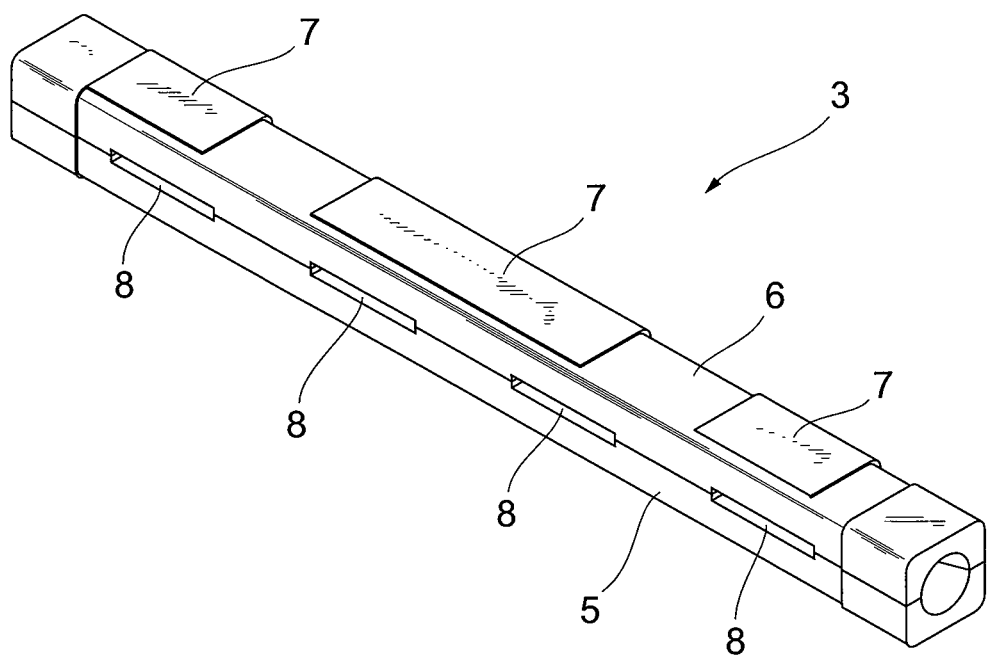
FIG. 5 is a perspective view of a mechanical splice section illustrated in FIG. 2.

As also illustrated in FIG. 5, the mechanical splice section 3 is constituted by a base plate 5 having a V-groove 4 for positioning the optical fibers 2, a pressing plate 6 for pressing the optical fibers 2 arranged in the V-groove 4 against the base plate 5, and a plurality of (3 here) U-shaped clamping springs 7 for holding the base plate 5 and pressing plate 6 in a vertical stack.

A boundary portion between the base plate 5 and pressing plate 6 is provided with a plurality of (4 here) wedge inserting recessed sections 8 into which wedge sections 13 of a wedge member 9 which will be explained later are inserted. Preferably, opening edge parts of the wedge inserting recessed sections 8 are chamfered. The base plate 5 and pressing plate 6 are held by the clamping springs 7 from the opposite side of the wedge inserting recessed sections 8.

The optical fiber connector 1 further comprises the wedge member 9 for opening the base plate 5 and pressing plate 6 of the mechanical splice section 3 from each other, a wedge insertion releasing member 10 for closing the base plate 5 and pressing plate 6, and a housing 11 which has a substantially rectangular cross-sectional form and covers the mechanical splice section 3, wedge member 9, and wedge insertion releasing member 10.

Figure 6:
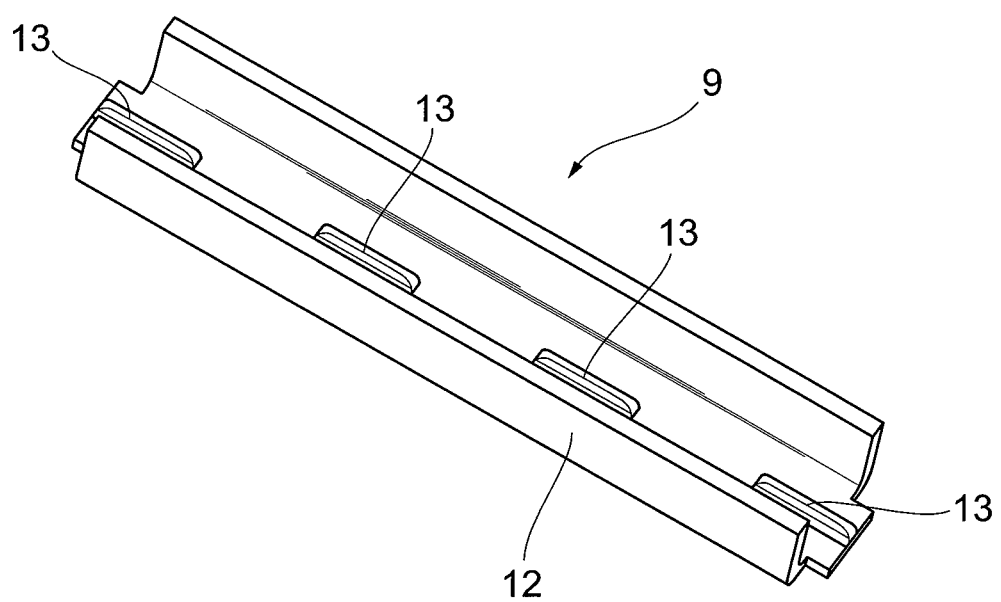
FIG. 6 is a perspective view of a wedge member illustrated in FIG. 2.

As also illustrated in FIG. 6, the wedge member 9 includes a main body section 12 having a U-shaped cross section and a plurality of (4 here) wedge sections 13 which project from the bottom face of the main body section 12 so as to be inserted into the respective wedge inserting recessed sections 8 of the mechanical splice section 3. The wedge sections 13 are arranged longitudinally of the main body section 12. The leading end part of each wedge section 13 is formed with a taper 13a which cooperates with its corresponding chamfer 8a of the wedge inserting recessed section 8 so as to make it easier for the wedge section 13 to enter the wedge inserting recessed section 8 (see FIG. 3).

Figure 7:
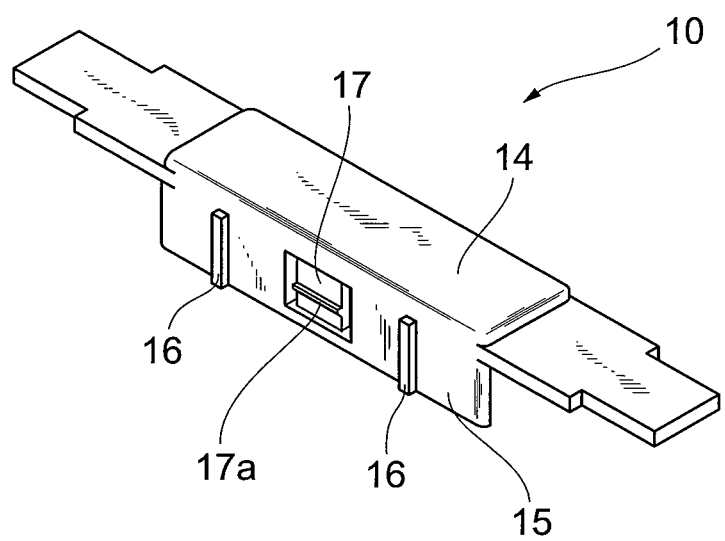
FIG. 7 is a perspective view of a wedge insertion releasing member illustrated in FIG. 2.

As also illustrated in FIG. 7, the wedge insertion releasing member 10 includes a planar pressing section 14 and a pair of supportable sections 15 extending in the same direction from both side edges of the pressing section 14. The outer side face of each supportable section 15 is provided with two restraint projections 16 adapted to engage the housing 11. A locking piece 17 adapted to engage the housing 11 is formed at a location between the two restraint projections 16 in each supportable section 15. A locking claw 17a is provided at a leading end part of the locking piece 17.

Figure 8:
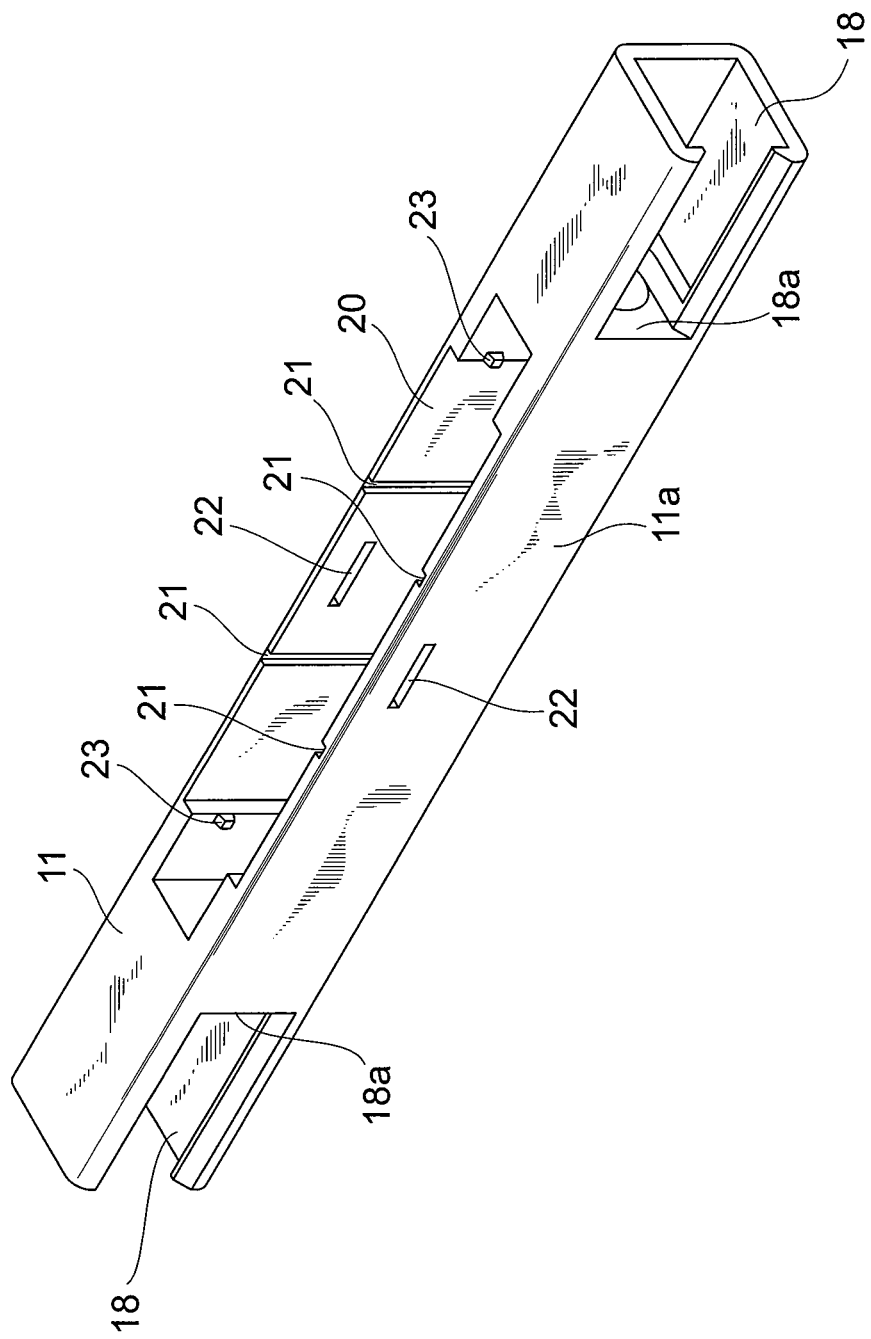
FIG. 8 is a perspective view of a housing illustrated in FIG. 2.

As also illustrated in FIG. 8, both end parts of the housing 11 are provided with fiber insertion guides 18 for inserting the optical fibers 2 into the mechanical splice section 3. Each fiber insertion guide 18 has an open section 18a opening at the upper face 11a of the housing 11 and thus is substantially shaped like letter U. Providing the housing 11 with such fiber insertion guides 18 makes it easier to position the optical fibers 2 in the V-groove 4 of the base plate 5.

A rectangular window section 19 for passing therethrough a pressing component 24 (see FIG. 11) for pushing the wedge member 9 when reinserting the wedge sections 13 of the wedge member 9 into the wedge inserting recessed sections 8 is provided at the center part of one side wall of the housing 11.

The other side wall of the housing 11 is formed with a window section 20 for exposing a pressing section 14 of the wedge insertion releasing member 10. Grooves 21 adapted to mate with the restraint projections 16 of the wedge insertion releasing member 10 are formed two by two on the upper and lower sides of the window section 20. Lock receiving holes 22 for receiving the respective locking claws 17a of the locking pieces 17 provided with the wedge insertion releasing member 10 are formed on the upper and lower walls of the housing 11.

The upper and lower walls of the housing 11 are provided with stopper claws 23 for preventing the mechanical splice section 3 from escaping more than necessary when the above-mentioned pressing component 24 (see FIG. 11) pushes the wedge member 9 into the mechanical splice section 3. The stopper claws 23 are disposed on both longitudinal end sides of the housing 11.

In the optical fiber connector 1 constructed by such four components, the mechanical splice section 3 is contained in the housing 11 such that the pressing plate 6 is positioned on the upper face 11a (open section 18a) side while the wedge inserting recessed sections 8 face the window section 19. Hence, the wedge member 9 is contained in the housing 11 so as to be positioned on the window section 19 side (one of the left and right sides) of the mechanical splice section 3, whereby the main body section 12 of the wedge member 9 can be seen through the window section 19. The wedge member 9 is constructed such that both side faces of the main body section 12 face or come into contact with the upper and lower wall inner faces of the housing 11.

Figure 9:
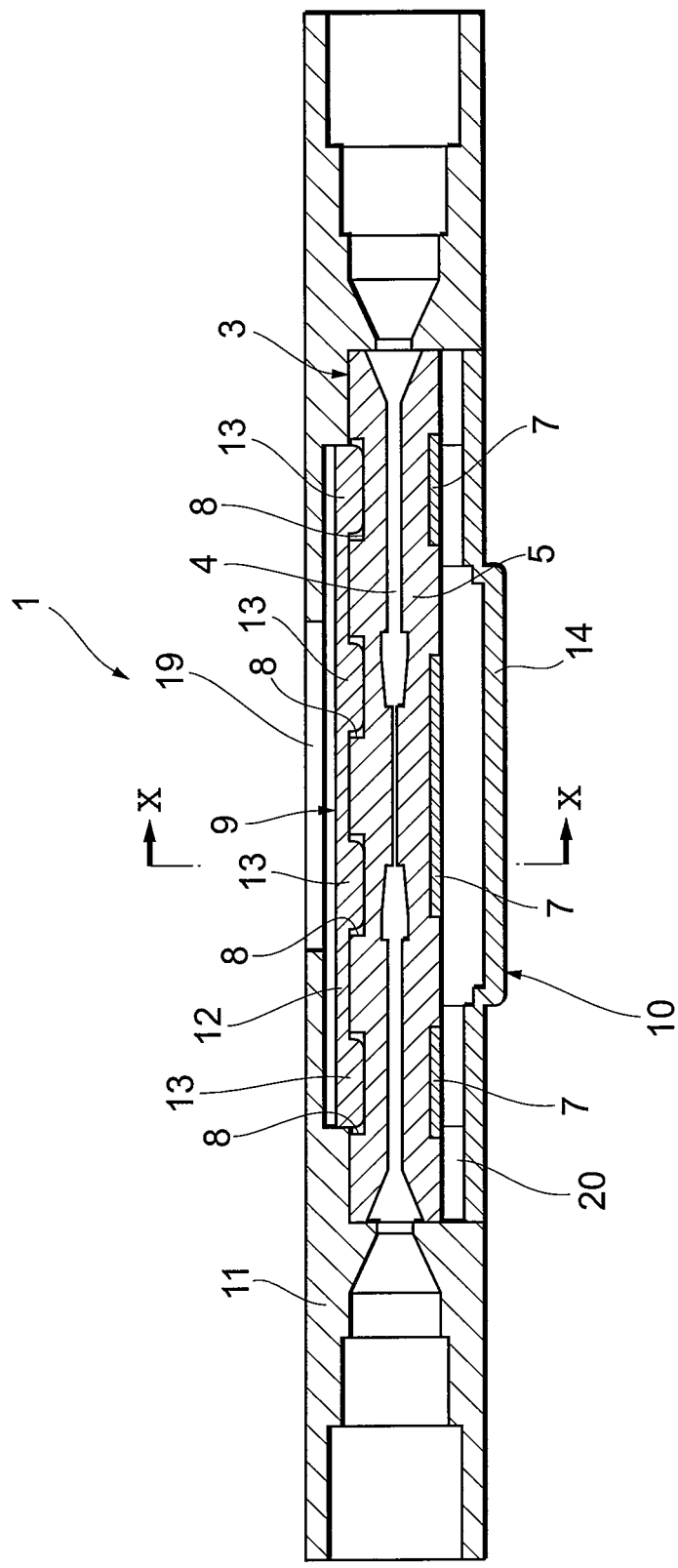
FIG. 9 is a horizontal sectional view of the optical fiber connector illustrated in FIG. 1, representing a state where no optical fibers are assembled thereto.
Figure 10:
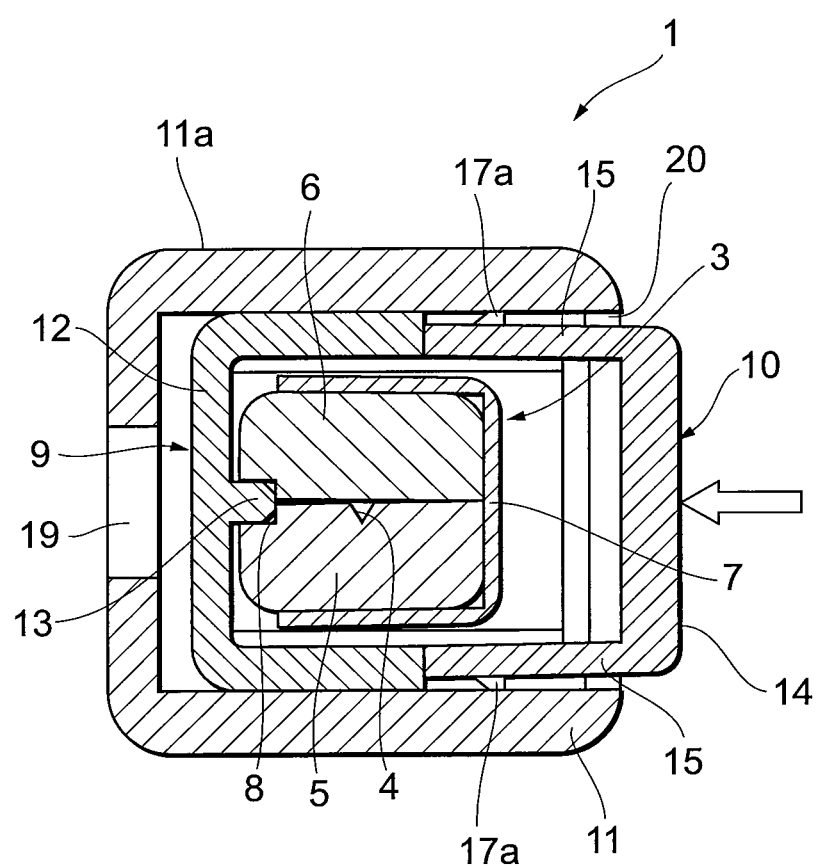
FIG. 10 is a sectional view taken along the line X-X of FIG. 9.

In a state where no optical fibers 2 are assembled to the optical fiber connector 1 (initial state of the optical fiber connector 1), as illustrated in FIGS. 9 and 10, the wedge sections 13 of the wedge member 9 are inserted beforehand in the wedge inserting recessed sections 8 of the mechanical splice section 3, whereby the base plate 5 and pressing plate 6 of the mechanical splice section 3 are slightly open from each other against urging forces of the clamping springs 7.

The wedge insertion releasing member 10 is contained in the housing 11 so as to be positioned on the window section 20 side (the other of the left and right sides) of the mechanical splice section 3. Specifically, the wedge insertion releasing member 10 is attached to the housing 11 such that each of the restraint projections 16 of the wedge insertion releasing member 10 enter the respective grooves 21 of the housing 11 while each of the locking claws 17a of the wedge insertion releasing member 10 fit into the respective lock receiving holes 22 of the housing 11. As a consequence, the mechanical splice section 3 is mostly covered with the wedge member 9 and wedge insertion releasing member 10. The main body section 12 of the wedge member 9 is arranged such as to oppose the supportable sections 15 of the wedge insertion releasing member 10.

Here, each of the restraint projections 16 of the wedge insertion releasing member 10 mate with the respective grooves 21 of the housing 11, whereby the wedge insertion releasing member 10 is prevented from shifting longitudinally of the housing 11. Since the locking pieces 17 of the wedge insertion releasing member 10 latch the housing 11, the wedge insertion releasing member 10 is prevented from dropping out of the housing 11.

When connecting two optical fibers 2 by using thus constructed optical fiber connector 1, the optical fibers 2 are initially subjected to a terminating process (cutting, coating removal, and the like). Subsequently, the optical fibers 2 are inserted into the mechanical splice section 3 along the fiber insertion guides 18 of the housing 11 from both sides of the optical fiber connector 1, so as to be positioned in the V-groove 4 of the base plate 5 and butted against each other. Here, it is desirable that a refractive index matching material be disposed between the two optical fibers 2.

Then, the pressing section 14 of the wedge insertion releasing member 10 is pushed inward (the arrowed direction of FIG. 10), so that the supportable sections 15 of the wedge insertion releasing member 10 push the main body section 12 of the wedge member 9, whereby the wedge sections 13 of the wedge member 9 are taken out of the wedge inserting recessed sections 8 of the mechanical splice section 3 as illustrated in FIG. 3. Here, the supportable sections 15 move toward the wedge member 9 while elastically deforming the locking pieces 17 along the upper and lower wall inner faces of the housing 11.

Taking the wedge sections 13 out of the wedge inserting recessed sections 8 allows the urging forces of the clamping springs 7 to close the base plate 5 and pressing plate 6 of the mechanical splice section 3, thereby securing the two optical fibers 2 to the mechanical splice section 3.

Since the pressing section 14 of the wedge insertion releasing member 10 is arranged in a side face section of the housing 11 here, even when an operator holds the optical fiber connector 1 by a hand such that the open sections 18a faces the operator in order for the fiber insertion guides 18 to be seen, for example, a finger of this hand can reach the pressing section 14 and easily push the same.

In the optical fiber connector 1 of this embodiment, the wedge member 9 and wedge insertion releasing member 10 are contained in the housing 11 as in the foregoing, whereby no wedge jig is required to be inserted into the wedge insertion releasing member 10 for pushing the base plate 5 and pressing plate 6 of the mechanical splice section 3 to open. This makes it unnecessary for operators to prepare a wedge jig each time when carrying out an operation of connecting the optical fibers 2 together on the spot, whereby the optical fibers 2 can easily be assembled to the optical fiber connector 1 while reducing the burden on the operators.

Figure 11:
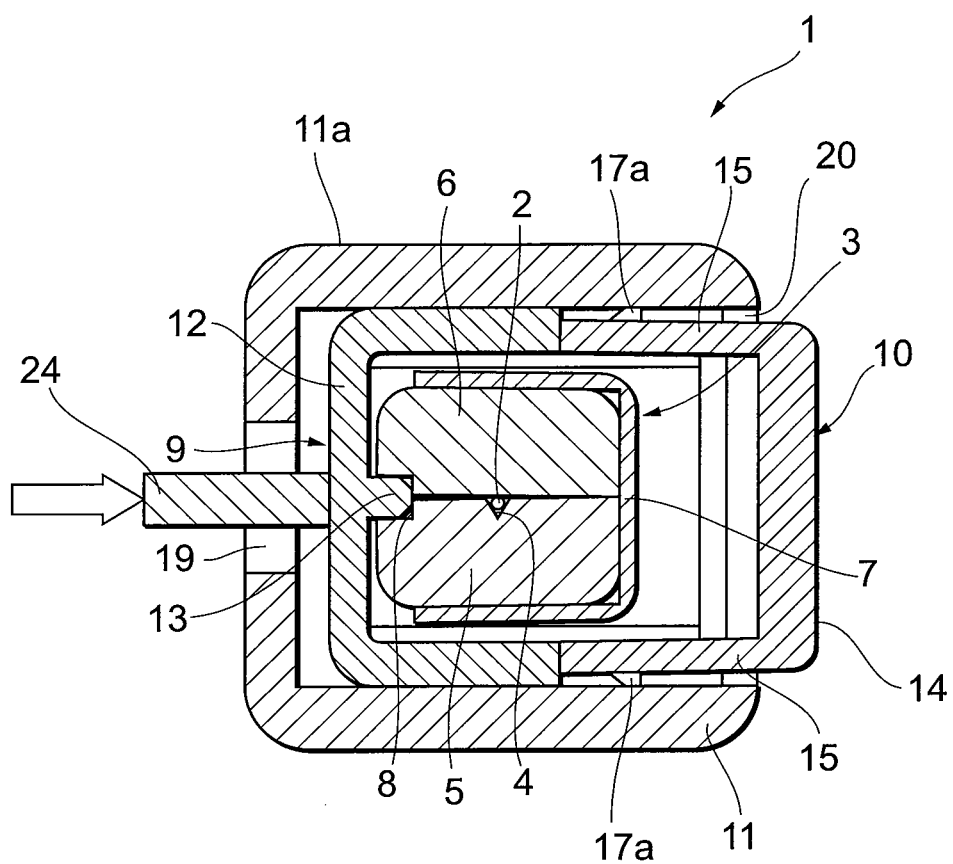
FIG. 11 is a sectional view illustrating a state where a wedge section of the wedge member represented in FIG. 3 is reinserted into a wedge inserting recessed section of the mechanical splice section.

Meanwhile, there is a case where it becomes necessary for the optical fibers 2 to be repositioned because they are slightly misaligned from each other, for example, even after having pushed the wedge insertion releasing member 10 so as to take the wedge sections 13 of the wedge member 9 out of the wedge inserting recessed sections 8 of the mechanical splice section 3. In this case, as illustrated in FIG. 11, the pressing component 24 is pushed against the wedge member 9 through the window section 19, so as to reinsert the wedge sections 13 of the wedge member 9 into the wedge inserting recessed sections 8 of the mechanical splice section 3, thereby pushing the base plate 5 and pressing plate 6 to open from each other. Therefore, the optical fibers 2 can be positioned accurately.

Figure 12:
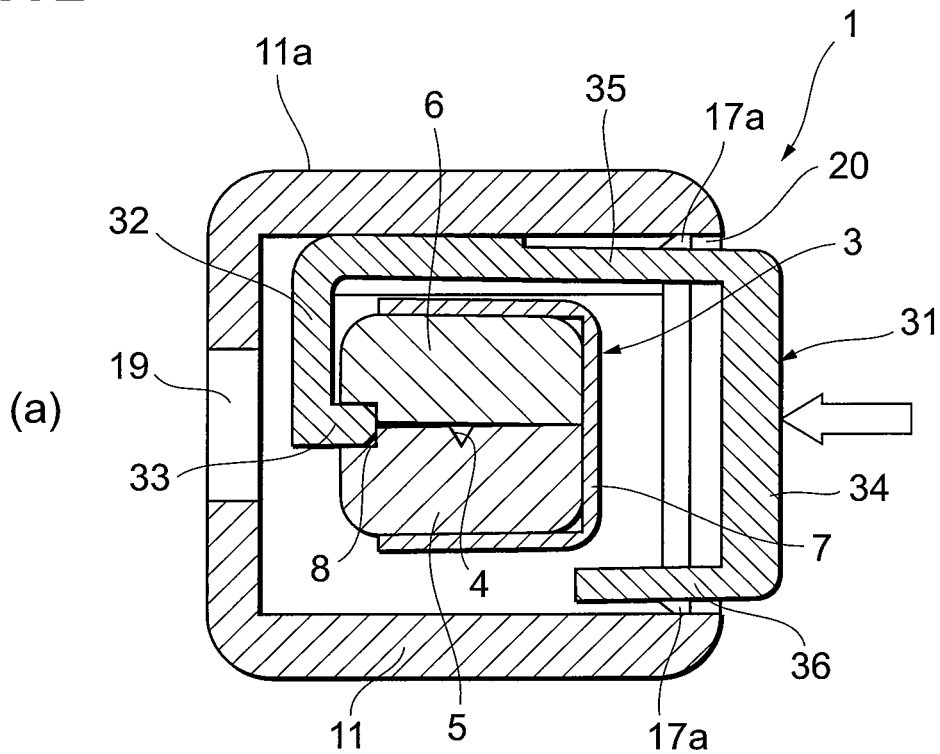
FIG. 12 is a sectional view illustrating another embodiment of the optical fiber connector in accordance with the present invention.
Figure 12:
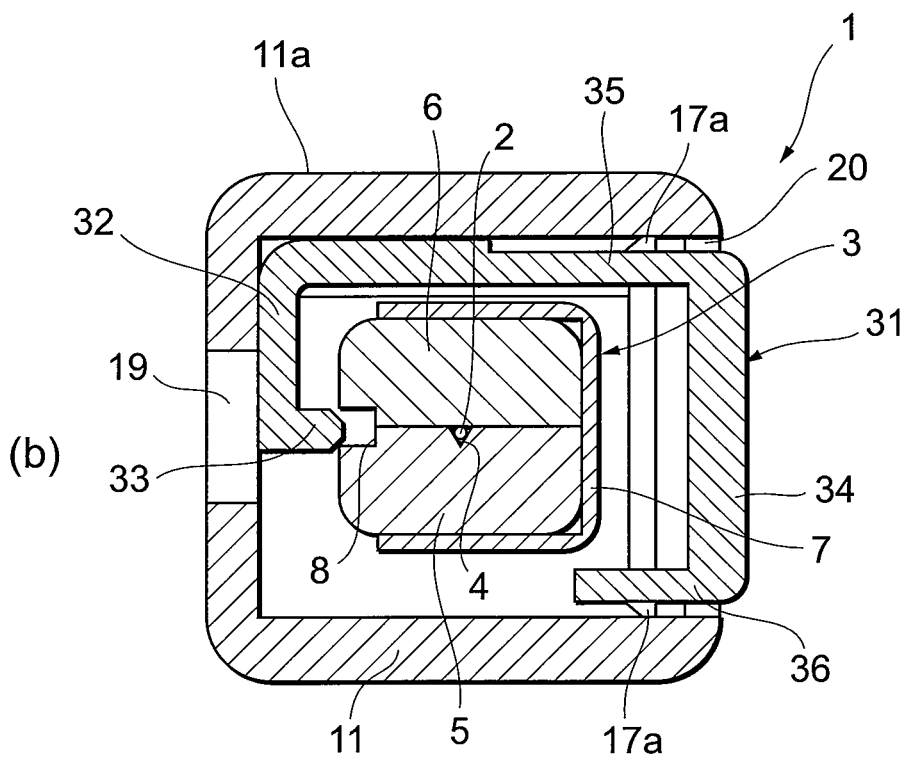

FIG. 12 is a sectional view illustrating another embodiment of the optical fiber connector in accordance with the present invention. In this drawing, the optical fiber connector 1 of this embodiment is equipped with a wedge member 31 having a structure in which equivalents of the wedge member 9 and wedge insertion releasing member 10 in the above-mentioned embodiment are integrated. Hence, the wedge member 31 is a member for opening and closing the base plate 5 and pressing plate 6 of the mechanical splice section 3.

The wedge member 31 includes a wedge base section 32 having an L-shaped cross section, a plurality of wedge sections 33 projecting from the wedge base section 32, a pressing section 34, and supportable sections 35, 36 extending in the same direction respectively from both side edges of the pressing member 34, while the supportable section 35 and the wedge base section 32 are integrated with each other. The wedge section 33 and pressing section 34 have the same structures as those of the wedge section 13 and pressing section 14 mentioned above, respectively. The supportable sections 35, 36 are provided with restraint projections 16 (not depicted) and locking pieces 17 similar to those of the above-mentioned embodiment. The other structures of the optical fiber connector are the same as those of the above-mentioned embodiment.

In the initial state of the optical fiber connector 1, the wedge sections 33 of the wedge member 31 are inserted beforehand in the wedge inserting recesses 8 of the mechanical splice section 3 as illustrated in FIG. 12(a), whereby the base plate 5 and pressing plate 6 of the mechanical splice section 3 are slightly open from each other.

Pushing the pressing section 34 of the wedge member 31 inward (in the arrowed direction) moves the wedge member 31 as a whole in the pushing direction, so as to take the wedge sections 33 out of the wedge inserting recessed sections 8 as illustrated in FIG. 12(b), thereby closing the base plate 5 and pressing plate 6.

Providing such wedge member 31 reduces the number of components necessary for the optical fiber connector 1, whereby the optical fiber connector 1 can be produced inexpensively.

Though the one illustrated in FIG. 12 has a structure in which the lower face side (base plate 5 side) of the mechanical splice section 3 is not covered with the wedge member 31, the mechanical splice section 3 may mostly be covered with the wedge member.

Figure 13:
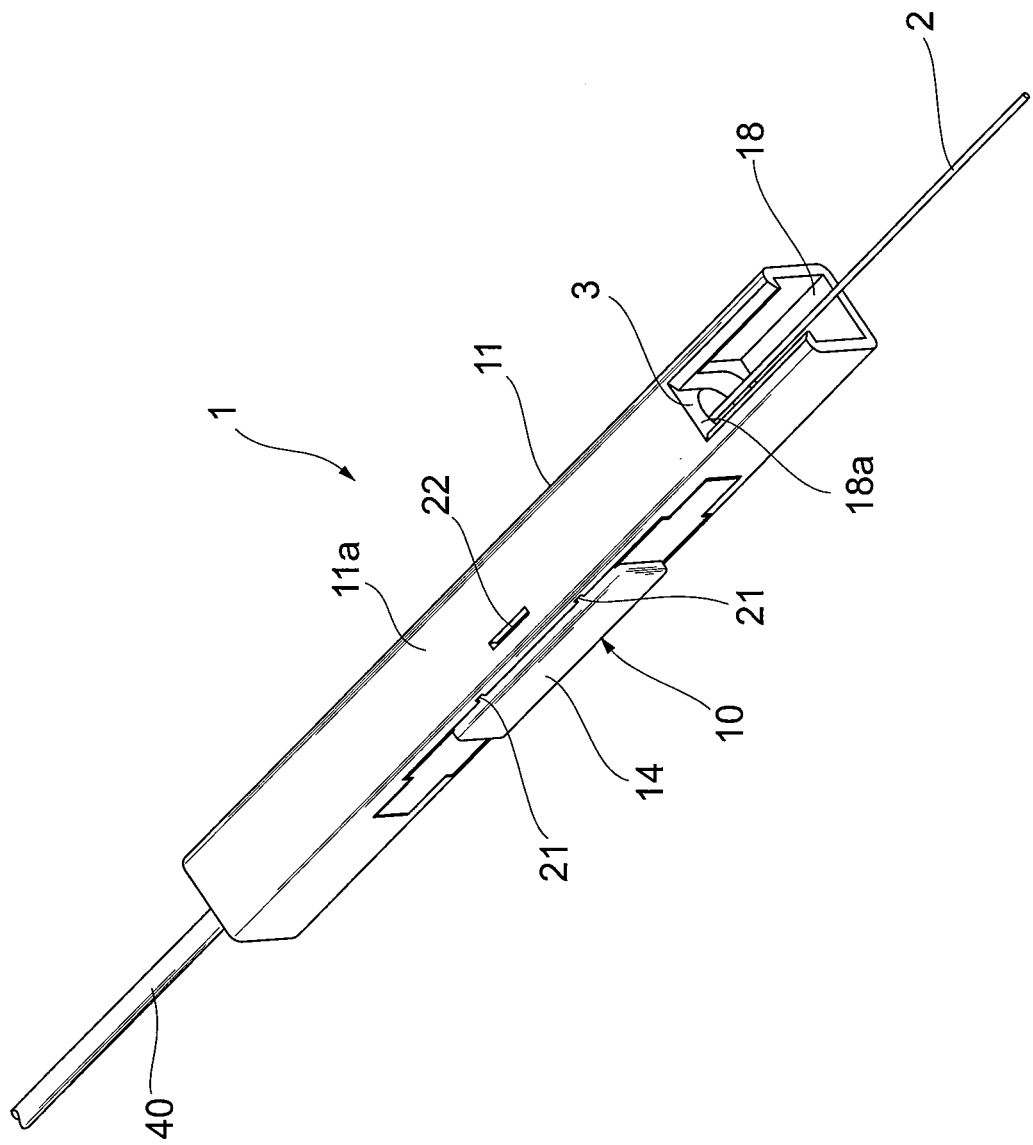
FIG. 13 is a perspective view illustrating one embodiment of an optical cable equipped with the optical fiber connector in accordance with the present invention.
Figure 14:
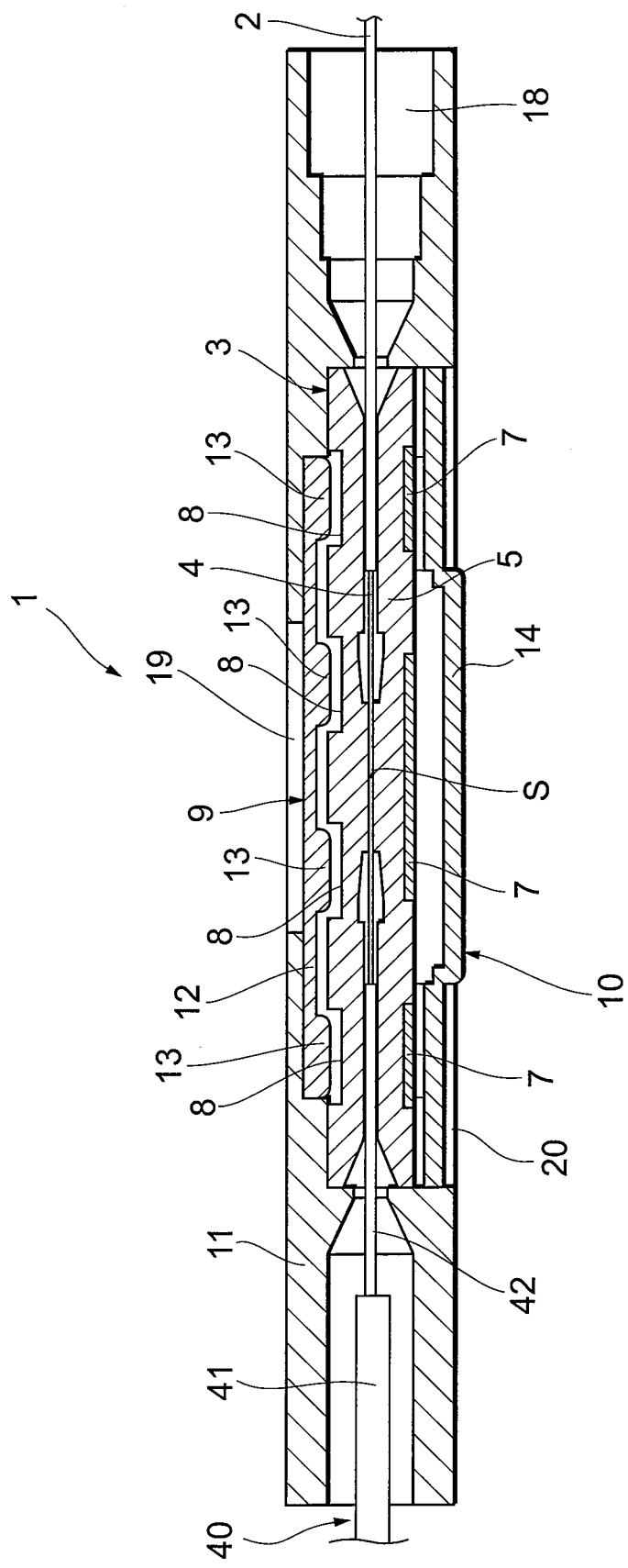
FIG. 14 is a sectional view of the optical cable equipped with the optical fiber connector illustrated in FIG. 13.

FIG. 13 is a perspective view illustrating one embodiment of an optical cable equipped with the optical fiber connector in accordance with the present invention, while FIG. 14 is a sectional view of the optical cable equipped with the optical fiber connector illustrated in FIG. 13.

In each drawing, the above-mentioned optical fiber connector 1 is attached to a cable end of an optical cable 40. A jacket 41 is removed from an end part of the optical cable 40, so as to expose an optical fiber 42. The optical fiber 42 is positioned in and held by the V-groove 4 of the mechanical splice section 3 in the optical fiber connector 1. The jacket 41 of the cable end part is secured to the housing 11 by securing means (not depicted) such as a blade section (rasp) in one end part of the housing 11. Here, only the other end part of the housing 11 is provided with a fiber insertion guide 18.

When connecting the optical fiber 42 incorporated in such optical cable 40 equipped with the optical fiber connector and the optical fiber 2 to each other, the optical fiber 2 is subjected to a terminating process and then positioned in the V-groove 4 of the mechanical splice section 3, so as to butt against the optical fiber 42. Subsequently, the wedge sections 13 of the wedge member 9 are taken out of the wedge inserting recesses 8 of the mechanical splice section 3 by the technique mentioned above. It will be sufficient if only the optical fiber 2 on one side is thus assembled to the optical fiber connector 1, whereby operations of connecting optical fibers on the spot can be carried out easily.

Preferably, a semisolid refractive index matching material S is attached to a leading end part of the optical fiber 42. The refractive index matching material S has a modulus of elasticity of $1 \times 10^4$ to $1 \times 10^6$ Pa, for example. Such semisolid refractive index matching material S does not flow out like greasy refractive index matching materials and keeps its form over a long period. Therefore, the refractive index matching property between the optical fibers 42, 2 can be secured even when the optical fiber 2 is repeatedly attached to and detached from the optical fiber connector 1.

The present invention is not limited to the above-mentioned embodiments. For example, though the above-mentioned embodiments connect optical fibers to each other by directly butting them against each other, a built-in fiber whose both end faces are mirror-processed may be arranged beforehand in the V-groove 4 of the mechanical splice section 3. Examples of such built-in fiber include those provided with a grating for blocking a specific wavelength of light and those functioning to adjust the mode field diameter (MFD) when connecting optical fibers having different MFDs.

The optical fiber connector of the present invention is also applicable to one connecting optical cables to each other, and to connecting multicore optical fibers to each other without being restricted to connecting single-core optical fibers to each other as mentioned above.

INDUSTRIAL APPLICABILITY

The present invention provides an optical fiber connector and optical cable by which operations of assembling optical fibers can be performed without preparing dedicated jigs.

The invention claimed is:

1. An optical fiber connector comprising:
    an optical fiber connecting member, having a base section for positioning optical fibers and a pressing section for pressing the optical fibers against the base section, for connecting the optical fibers to each other;
    a housing for covering the optical fiber connecting member;
    a wedge member, contained in the housing, having a wedge section adapted to be inserted into a boundary portion between the base section and pressing section so as to open the base section and pressing section from each other; and
    a wedge insertion releasing member for taking the wedge section out of the boundary portion between the base section and pressing section, said wedge insertion releasing member includes at least one supportable section arranged inside the housing,
    wherein said housing includes a wall having a lock receiving hole formed thereon,
    wherein said at least one supportable section includes a locking claw arranged in said lock receiving hole for attaching the wedge insertion releasing member to said housing, and
    wherein said wedge insertion releasing member is mechanically connected to said wedge member such that said wedge section is taken out of the boundary portion in response to movement of said wedge insertion releasing member.

2. An optical fiber connector according to claim 1, wherein the wedge member is contained in the housing in such a state that the wedge section is inserted beforehand in the boundary portion between the base section and pressing section.

3. An optical fiber connector according to claim 1, wherein the housing is provided with a window section for passing therethrough the wedge member in a direction of inserting the wedge section.

4. An optical fiber connector according to claim 1, wherein:
 an end part of the housing is provided with a fiber insertion guide for inserting the optical fibers into the optical fiber connecting member;
 the fiber insertion guide has an open section formed on one side face of the housing;
 the wedge member is contained in the housing so as to be located on one of left and right sides of the open section; and
 the wedge insertion releasing member is attached to the housing so as to be located on the other of the left and right sides of the open section.

5. An optical fiber connector according to claim 1, wherein the wedge insertion releasing member is integrated with the wedge member.

6. An optical cable having the optical fiber connector according to claim 1 attached to a cable end.

7. An optical cable according to claim 6, wherein:
 the optical fiber connecting member of the optical fiber connector holds an optical fiber exposed at the cable end; and
 a semisolid refractive index matching material is attached to a leading end of the optical fiber.

8. An optical fiber connector according to claim 1, wherein at least one supportable section includes at least one restraint projection arranged in a groove formed on a surface of the housing.

* * * * *